United States Patent
Krumpoch et al.

(10) Patent No.: US 12,418,401 B2
(45) Date of Patent: Sep. 16, 2025

(54) FULL PARALLELIZATION AND ENABLEMENT OF RANDOM ORDER COMPUTATION OF CRYPTOGRAPHIC HASHES

(71) Applicant: General Dynamics Mission Systems, Inc., Fairfax, VA (US)

(72) Inventors: Mark Krumpoch, Fairfax, VA (US); David Kornbau, Fairfax, VA (US); Gerardo Orlando, Fairfax, VA (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 284 days.

(21) Appl. No.: 18/305,719

(22) Filed: Apr. 24, 2023

(65) Prior Publication Data

US 2024/0356728 A1 Oct. 24, 2024

(51) Int. Cl.
*H04L 29/06* (2006.01)
*H04L 9/06* (2006.01)

(52) U.S. Cl.
CPC .......... *H04L 9/0637* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 5,066,927 A | * | 11/1991 | Dent | H03K 23/667 331/25 |
| 2011/0103578 A1 | * | 5/2011 | Orlando | H04L 9/3236 708/620 |
| 2021/0176037 A1 | * | 6/2021 | Schiffman | H04L 9/0618 |

* cited by examiner

*Primary Examiner* — Andrew J Steinle (74) *Attorney, Agent, or Firm* — Ingrassia Fisher & Lorenz, LLP (57) ABSTRACT

Systems and methods efficiently process digests, hashes or other results by performing multiplicative functions in parallel with each other. In various embodiments, successive processing stages are provided for calculating a plurality of powers of the common value, processing each of a plurality of pairs of first and second elements of the input values, wherein the processing comprises multiplying the first elements of the input values by the common value and combining the products with second elements of the input values, performing additional processing using the plurality of processed pairs as the subsequent set of input values and using a power of the common value, multiplying each of the processed pairs with one of the plurality of powers of the common value to generate a set of output values, accumulating the set of output values, and providing the digest as a function of the set of output values.

18 Claims, 3 Drawing Sheets

FULL PARALLELIZATION AND ENABLEMENT OF RANDOM ORDER COMPUTATION OF CRYPTOGRAPHIC HASHES

TECHNICAL FIELD

The present disclosure generally relates to data processing, and some implementations related to techniques and systems for efficient fully parallelized and random order computation of a hash family based authentication code, such as POLY1305 operating over prime fields and GHASH for authenticating Galois Counter Mode (GCM), to closely match the computation of the universal hashes with the number of encryption blocks in authenticated encryption schemes in a computing environment.

BACKGROUND

Traditional cryptography refers to the practice of obscuring information to prevent unauthorized access. Modern cryptography generally makes use of mathematical ciphers and other techniques to ensure that only authorized users are able to access encrypted data. Cryptographic techniques have also been used to verify the identities of people, software or other entities. So-called "digital signatures", for example, commonly use cryptographic techniques to verify that a person or entity "signing" an electronic message is in fact the party that it claims to be. Cryptography is commonly used in electronic commerce, both for identifying parties to transactions and for ensuring that confidential data (e.g., credit card numbers) are not exposed to unauthorized parties. Cryptography is also widely used in many other commercial, military and personal settings to authenticate parties to electronic communications and/or to preserve the confidentiality of communications.

In recent years, cryptographic techniques have become more and more advanced, both in terms of the mathematics involved and the computing resources used to process such algorithms. The GCM technique, for example, is one example of a block cipher system that provides both confidentiality and data origin authentication and integrity. Typically, the authenticated encryption operation of GCM receives four inputs corresponding to a secret key, an initialization vector (IV), a plaintext, and additional authenticated data (AAD). The GCM system conventionally provides two outputs: a ciphertext message that corresponds to the encrypted plaintext, as well as an authentication tag that can be used to verify the identity of the sender and/or to ensure that the integrity of the decrypted ciphertext. The authentication tag is conventionally computed according to a well-known digest technique, such as "GHASH", which is generally considered to be relatively computationally demanding and is typically used in hardware implementations. As a result, the data processing resources used to compute conventional GHASH digests in the time frames generally requested for electronic communications can be significant; these computational demands are often met with hardware that can be relatively expensive and/or that can consume an undesirable amount of power. Many other types of block cipher systems and other cryptographic techniques other than GCM are similarly deployed in many different computing environments, and many of these techniques can similarly demand significant processing resources to provide computed results in the requested timeframes. Poly1305 is another cryptographic digest operating over prime fields and is typically used in software implementations. It is desirable to create systems and techniques for efficiently creating digests of block cipher or other digital data. Other desirable features and characteristics will become apparent from the subsequent detailed description and the appended claims, taken in conjunction with the accompanying drawings and this background of the invention.

BRIEF SUMMARY

According to various embodiments, systems and methods to efficiently process digests, hashes or other results for use in cryptography and/or other applications as desired. Generally speaking, processing of more than one multiplicative function can be performed more-or-less simultaneously, thereby streamlining the processing of multiplication-heavy algorithms. In various embodiments, successive processing stages are provided, with each stage performing parallel multiplicative functions and also combining input terms to reduce the total number of terms that remain to be processed. By progressively combining the active terms into a smaller number of terms for subsequent processing, the time needed to process a digest, hash, cyclic redundancy check (CRC) code or similar function can be significantly reduced.

In some embodiments, a method executable by digital processing logic computes a digest that represents a set of input values processed with common value, wherein the input values are initially treated as a set of active values and the common value is initially treated as a multiplier value. This exemplary method comprises processing each of a plurality of pairs of first and second sets of the active values, wherein the processing comprises multiplying the first sets of the active values by the multiplier value and combining the products with second sets of the active values, performing additional processing using the plurality of processed pairs as the subsequent set of active values and using a square of the prior multiplier value as a subsequent multiplier value, and providing the digest as a function of the processed pairs.

Other embodiments suitably provide a system to process a digest of a set of input values processed with a common value. This exemplary system comprises a first processing stage and at least one subsequent processing stage. The first processing stage is appropriately configured to receive the set of input values and to create a plurality of first paired values from the set of input values, each of the paired values representing a first element of the set of terms that is multiplied by the common value and combined with a second element of the set of terms. The subsequent processing stage is configured to receive the paired values from the prior processing stage and to create at least one second paired value from the received paired values, each of the at least one second paired values representing a first one of the first paired values that is multiplied by a square of the common value and that is combined with a second element of the first paired values. In some implementations, the various processing stages may be implemented in hardware using a field programmable gate array (FPGA) or other configurable gate array (CGA) device.

Still other embodiments provide a method executable by digital processing logic to compute a GHASH digest of a set of cryptographic values processed with a hash subkey, wherein the cryptographic values are initially treated as a set of active values and the hash subkey is initially treated as a multiplier value. This exemplary method comprises processing each of a plurality of pairs of first and second elements of the active values in parallel, wherein the parallel processing comprises multiplying the first elements of the active values by the multiplier value and combining the products with second elements of the active values, wherein the plurality of processed pairs represents the set of active values using fewer terms than the set of active values. Further parallel processing is subsequently performed for any number of subsequent stages using the plurality of processed pairs as the subsequent set of active values and using a square of the prior multiplier value as a subsequent multiplier value until a single resulting pair remains. The GHASH digest is then provided as a function of the single processed pair. Various further embodiments may combine serial and parallel processing of the set of cryptographic values, as desired.

Other embodiments may variously include software program products, digital storage media and/or other apparatus incorporating structures and/or techniques described herein. Additional detail about various embodiments is set forth below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The general structures and functions described herein are frequently described in conjunction with cryptographic functions such as the GCM. GCM and similar block cipher functions are simply examples of implementations that may make use of the concepts described herein. Equivalent embodiments may use similar structures and functions to process any number of other data types in addition to or in place of the cryptographic functions described herein. For example, equivalent techniques could be used in any sort of multiplicative hashing, in the computation of cyclic redundancy check (CRC) codes, and/or in any other applications as desired. In some exemplary embodiments, Poly1305 may be used as a secret key message authentication code for authenticating a single message using a key shared between the sender and recipient. Poly1305 computes a 16-byte authenticator of a message of any length, using a 16-byte nonce, or unique message number, and a 32-byte secret key. Attackers can't modify or forge messages if the message sender transmits an authenticator along with each message and the message receiver checks each authenticator.

GCM is an authenticated encryption mode using symmetric key cryptographic block ciphers. The GCM algorithm provides both data authenticity, integrity and confidentiality for block ciphers having a block size of 128 bits. GCM encrypts some or all of the data and performs a hash of the encrypted and associated (not encrypted) data. GCM is operative to perform an XOR operation on the plain text (Pt) with a pseudorandom string ($E_k$) to generate the cyphertext (C). For counter mode algorithms, the pseudorandom string (Ex) is created by encrypting the output of a counter with a symmetric key (Ks) with an encryption algorithm. This process is continued for all "n" blocks of plain text ($P_n$) to generate "n" blocks of cyphertext ($C_n$). To ensure a sufficient level of randomness, the counter value is concatenated with an initialization vector (IV). GCM specifies how to process IV into the counters that feed the cypher blocks. In some exemplary embodiments, the initialization vector for GCM is 96 bits and the counter is 32 bits resulting in a desired 128 bit block.

GHASH is used to ensure the integrity of the encrypted data. GHASH is a universal hash function which operates over $GF(2^{128})$ and can be used for constructing a Message Authentication Code (MAC). In general, a hashing function is used to convert a numerical value having an arbitrary length to a compressed numerical value having a fixed length. To achieve the GHASH, the Cyphertext ($CT_1$) is fed to a hashing function ($GHASH_1$). The result of the hashing stage is fed to the next stage of the algorithm. Typically, GHASH and Poly1305 use a secret key that is used through the hashing function, such as the value H used for GHASH.

A problem exists with GCM and GHASH particularly in that their computation involve very large operands, such as 128-bit operands, when dealing with large data packets/frames. Typical computation methods for these cryptographic hashes involve multiply-accumulate operations which do not scale with current needs. The presently disclosed methods allow for full-parallelization, minimization and removal of the "multiply-accumulate" bottleneck by including a mix of serial and parallel steps. In addition, the presently disclosed methods teaches an alternative approach that overcomes the accumulation bottleneck which may include using out of order computation with aid of lookup tables. According to various exemplary embodiments, systems and processes are provided that efficiently process data using parallel multiplicative functions that can be performed more-or-less simultaneously, thereby streamlining the processing of multiplication-heavy algorithms. Successive processing stages are provided, with each stage performing parallel multiplicative functions and also combining input terms to reduce the total number of terms that remain to be processed. By progressively combining the active terms into a smaller number of terms for subsequent processing, the time needed to process a digest, hash, CRC code or similar function can be significantly reduced. Further, the methods allow for fully parallelizing and enabling random order computation of GHASH in some embodiments. Some embodiments could implement the techniques and systems described herein using field programmable gate arrays (FPGAs) or other configurable gate array (CGA) devices, thereby allowing for convenient and relatively low-cost hardware implementation that is capable of high-speed processing in any number of demanding environments and applications.

Figure 1:
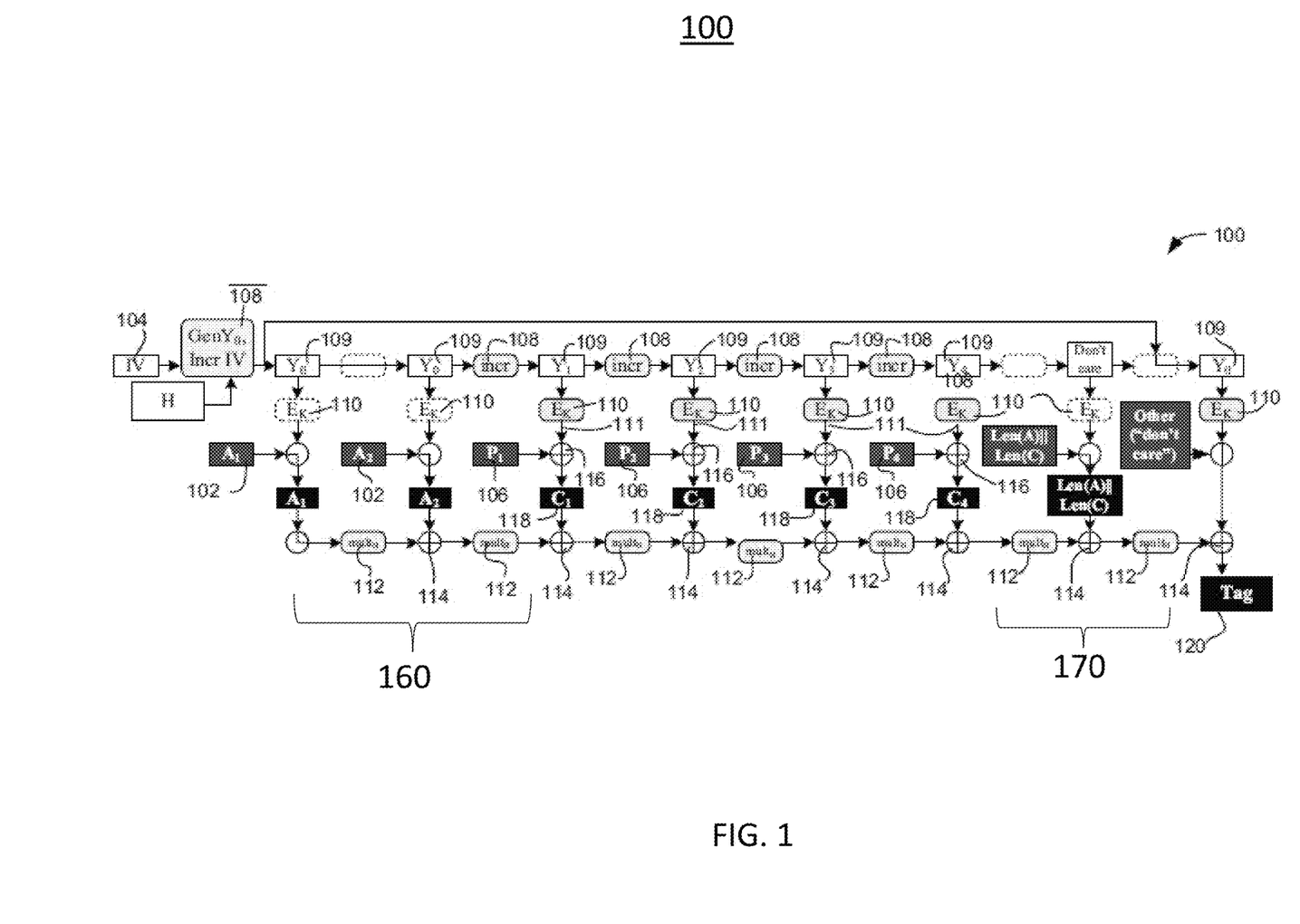
FIG. 1 is a diagram of a conventional cryptographic system.

With reference now to FIG. 1, an exemplary system 100 that is shown based upon the cryptographic system suitably encrypts plaintext 106 of any appropriate size or format to create ciphertext 118 using conventional techniques and processes. As shown in FIG. 1, system 100 typically begins with an initial value (IV) 104 that is incremented 108 any number of times to create a series of counter values 109 that are sequentially applied to a cryptographic function 110. Function 110, in turn, manipulates the received values 109 according to any appropriate block cipher or other algorithm to generate a stream of pseudorandom key values 111. These key values 111, in turn, may be combined with the plaintext 106 of the message to create encrypted ciphertext 118. Key values 111 may be combined with the plaintext 106 in any suitable manner; in various embodiments (and as illustrated in FIG. 1), the combination 116 is simply a bit-wise XOR function, although other embodiments may perform any other bitwise or other logical functions on the plaintext 106, as desired.

In addition to creating the encrypted ciphertext, conventional GCM systems 100 provide authentication of the data sender using a GHASH or similar algorithm. The GHASH algorithm conventionally begins with "additional authenticated data" (AAD) 102 based upon a digital signature or other information unique to the data sender. That initial data 102 is suitably multiplied by a hash subkey "H" 112 before being XOR'ed or otherwise combined 114 with a portion of the ciphertext 118. The value resulting from combination 114 is then supplied to a subsequent multiplier 112, where it is again multiplied by the hash subkey "H". The serialized cycles of repeatedly multiplying a feedback value by the hash subkey and then combining the resulting product with additional ciphertext 118 continues until all of the ciphertext 118 has been processed. The result of the final combination of terms can then be further processed (e.g., using the GCM processing features shown in FIG. 1) and/or provided as an output "tag" that represents all of the ciphertext data with a shortened digest 120.

Digest 120 is any hash value or other abstraction that represents the input data (e.g., ciphertext 118) in a shortened form. Typically, digest 120 is output from a deterministic procedure that uses bitwise (e.g., XOR) or other functions so that the output digest will change if any portion of the input data changes. In the GHASH example, the output tag digest 120 may be approximately the same length as a single block of ciphertext 118, but the contents of the tag block 120 will be set or cleared based upon the entire set of the ciphertext 118. That is, even minor changes in any portion of the ciphertext bitstream will be reflected in the shortened digest 120. In particular, the GHASH tag will typically represent a set of input values $a_0$-$a_n$ as a polynomial function of the hash subkey "H" as follows:

$$GHASH = a_n H^n + a_{n-1} H^{n-1} + \ldots + a_1 H + a_0 \quad (1)$$

where "+" represents the bitwise XOR function and where multiplication and exponentiation is performed in accordance with conventional constructs (e.g., the $GF(2^{128})$ Galois Field for (GCM). Other embodiments may use other functions, algorithms and techniques other than GCM (with correspondingly different relationships than Equation 1), as desired. Examples of other digest-generating algorithms include MD4, MD5, SHA, RIPEMD and the like. The process for Poly1305 is very similar, but uses operation over finite fields vs. Galois fields.

In many embodiments, the digest 120 is provided to a message recipient along with the generated ciphertext. The recipient typically uses the digest 120 to verify that the contents of the ciphertext have not changed during transit, and that the sender's credentials are acceptable. Generally, the recipient of the encrypted ciphertext 118 will repeat the GHASH (or other appropriate) technique on the received data to ensure that the GHASH computed on the received values matches that of the transmitted values, thereby ensuring the integrity of the received data. Both transmitters and receivers, then, typically execute the GHASH algorithm to compute digests of cryptographic data.

The GHASH algorithm shown in FIG. 1, however, can be relatively slow to implement in practice due to the serialized multiplicative functions 112. Multiplicative functions are generally considered to be relatively slow and computationally intense, particularly in contrast to the much faster bit operations commonly performed by blocks 110 and 116 in converting plaintext 106 to ciphertext 118. Processing the serial chain of multiplications as shown in FIG. 1, then, can be relatively time consuming. As a result, relatively fast hardware (e.g., microprocessors, application specific integrated circuits (ASICs) and/or the like have been conventionally used in many communications settings to ensure adequate throughput.

Various embodiments therefore streamline the computation of GHASH or similar digests 120 by exploiting parallel multiplicative functions, in which multiple terms are simultaneously processed and in which the numerous input terms can be sequentially reduced to a single term (or a few terms that can readily be processed to result in an output digest value). Because the ciphertext 118 can generally be processed much faster than the digest tag 120, the various coefficients $a_0$-$a_n$ shown in Equation 1 above are typically available relatively quickly. Rather than serially chaining the multiplicative functions 112 of the various terms used to create tag 120, then, the various terms based upon ciphertext 118 may be processed at least partially in parallel. Note that "multiplication", in this context, may refer to processing in accordance with GCM or other algorithm, which may incorporate multiplicative or other processing that differs from or otherwise augments classical multiplication. That is, the actual "multiplicative function" that is performed in some embodiments may involve multiplicative hashing or any other sort of processing other than or in addition to conventional multiplication of numeric values.

In some exemplary embodiments, some portions of the message can be initially calculated, retained and reused as long as subsequent messages are being transmitted to the same destination. For example, that authentication part 160 of the message is not encrypted. So if the messages are being transmitted to the same party, the hash subkey values remain the same. Reuse of this precalculated authentication part 160 reduces computational requirements by a fraction of one multiply. Out of 32 bytes in the authentication part, only 4 bytes change typically. Likewise, pre-calculation and reuse of the length fields 170 when the messages are of the same length can reduce the computational requirements to a fraction of one multiply. Typically the length of the unencrypted authentication portion 160 and the encrypted portion are two bytes each for a total of four bytes. For messages being transmitted, out of 16 bytes, only 4 bytes change due to the length fields, with the remaining blocks being all zero. Therefore, a low complexity 16×4 byte multiplier can be used in place of a full size 16×16 byte multiplier. The net result is that the pre-calculated authentication part 160 is followed by calculation of the encrypted portion and finally the length field 170 is added. In some exemplary embodiments, the multiplication stages for the length field 170 can be combined into a single multiplication step.

Figure 2:
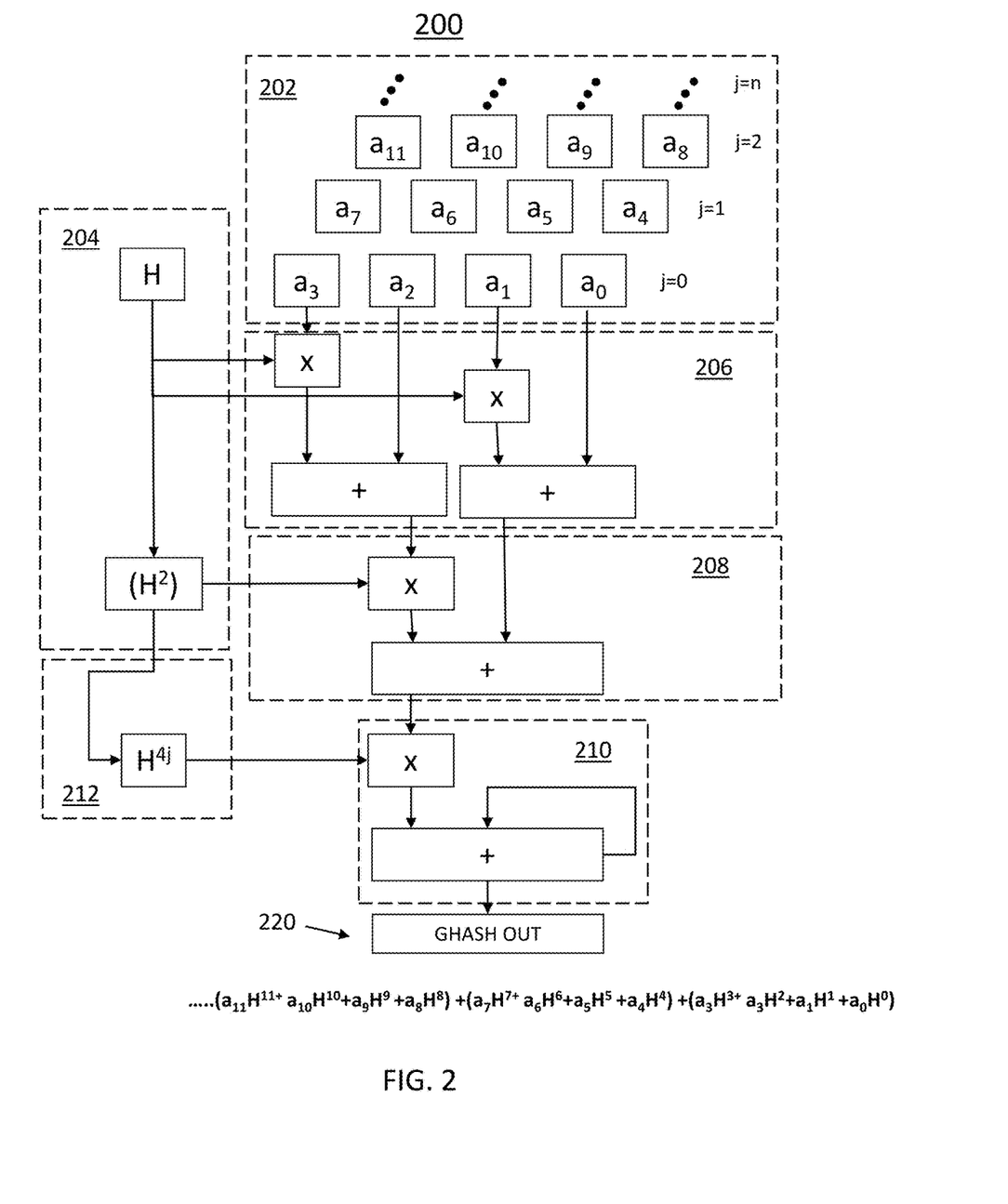
FIG. 2 is a block diagram showing an example of logic that could be used to implement an exemplary system or technique for processing a set of input values.

FIG. 2, for example, shows one process for efficiently processing data to create a digest or similar output using of computational logic 200 that combines serial and parallel processing to compute a GHASH digest, Poly1305 digest, or other output. The example of FIG. 2 shows two processing stages 206 and 208 that perform multiplication and combination functions on two (or more) serially-provided data sets 202. An additional stage 210 provides post-processing of the resultant values to create an output digest 220. Although the logic 200 illustrates an example with four parallel processing channels, other embodiments may add or subtract processing stages and other features to support processing of any number of input and output terms.

The exemplary implementation of logic 200 that could be used to compute a digest or perform other data processing tasks for perform a GHASH processing scheme that reduces multiple terms to a single output term. The general concepts illustrated in FIG. 2, however, could be readily abstracted or supplemented to any number of other implementations, including other GHASH schemes that process different amounts or formats of input data. Although the logic 200 could be implemented in any manner, various embodiments could conveniently implement the various function blocks shown in FIG. 2 with a field programmable gate array (FPGA) or other CGA-type device.

FIG. 2 shows logic 200 as including three processing stages 202, 204 and 206. Each of these stages 202, 204, 206 performs a process to apply the correct power of hash subkey (H) to each of the input values and to combined the processed input values into a single output. In accordance with some exemplary embodiments, input values 202 are sequentially applied to the first stage 206. Each of these sets of input values is independently processed using the techniques described above to create sets of output values. The first set of input values $a_3$, $a_2$, $a_1$, and $a_0$ are processed to generate two output terms of the first stage 206. $a_3$ and $a_2$ are each is multiplied by the hash subkey (H) value. The resulting values are combined with $a_2$ and $a_0$ respectively, resulting in two output term $Ha_3+a_2$ and $Ha_2+a_0$. Subsequently in the second processing stage 208, the $Ha_3+a_2$ term is further multiplied by a square ($H^2$) of the hash subkey (H) value and combined with the $Ha_1+a_0$ to generate a single output of $H^3a_3+H^2a_2+Ha_1+a_0$. Each of the sets of input values can be calculated similarly with the output of the second stage having the format $H^3a_n+H^2a_{n-1}+Ha_{n-2}+a_{n-3}$ The third state 210 is configured to accumulate the output values from the second processing stage 208 and to apply the appropriate hash subkey multiplier for each of the output values. At initialization, the third stage 210 is reset to zero, such that the first output value is accumulated with zero. Previously, the best way to compute this step was with multiply-accumulate type operations that exhibit a feedback path limiting processing speed. This resulted in a bottle-neck in the computations as each output value from the second processing stage 208 was accumulated and then multiplied by the hash subkey value to the power of four ($H^4$). Altering the computation from a multiply accumulate in a tight loop to a simple accumulate allows for substantial computational efficiency gains and required time reductions.

The currently described approach computes the hash subkey value separately, outside of the critical path, for each of the sets of input values as indicated by the value of j. (j=0, 1, 2, 3, . . . n) This approach allows for full-parallelization and minimization in order to avoid the "multiply-accumulate" bottleneck such that the critical path includes only the accumulate function. Efficiency of this approach is close to optimal which together with speed optimizations can provide a path for computation at terabits per second speed. In addition, since the hash subkey (H) value does not change for a given security association, the values of $H^{4j}$ can be computed once and used repetitively. These computed values can be stored in a lookup table or the like or compute on-the-fly with optimized approach when supporting large number of security associations (SA).

In the example of FIG. 2, the output of the second stage 208, $H^3a_3+H^2a_2+Ha_1+a_0$. corresponding to the first set of input values $a_3$, $a_2$, $a_1$, and $a_0$ is first multiplied by $H^{4j}$ where j=0 for the first set of input values. Thus the resulting value is $H^3a_3+H^2a_2+Ha_1+a_0$ as $H^0=1$. For the second set of input values $a_7$, $a_6$, $a_5$, and $a_4$ corresponding to j=1, $H^{4j}=H^4$ and the resulting value is $H^7a_7+H^6a_6+H^5a_5+H^4a_4$. This is then accumulated with the prior terms. This process is repeated for each of the sets of input values until j=n such that the resulting accumulation from the third state 210 is the desired GHASH 220. The output may be provided as an argument returned from a programming function, routine or other procedure in some software implementations. Alternately, the output value may be latched or otherwise output from a hard-wired digital logic circuit (e.g., a CGA, ASIC or the like). Other embodiments may provide the output value in any format using any sort of hardware, software, firmware and/or other logic, as desired.

The hash subkey (H) or other multiplier may be provided to the hash subkey multiplication section 204 from a common source to multiple multiplication blocks in the various stages. This feature could further reduce the time needed to execute the overall process 200, since the multiplier value need only be determined once before being supplied to the other logic that uses the common value. In a GHASH implementation, for example, the hash subkey (H) need only be computed once to be used in various blocks within logic 200.

Even further, the hash subkey can be squared or otherwise processed between stages. In the exemplary logic 200, the multiplier is squared in the hash subkey multiplication section 204 to generate $H^2$, and then the result can be squared again to generate values of H to the fourth power. In some exemplary embodiments, a hash subkey incrementation block 212 can receive this fourth power value of H which can then be incremented by a value of j for corresponding sets of input values and is used to compute the needed $H^{4j}$ values. As noted above, squaring is of lower complexity than multiply operations and can typically be performed very efficiently using digital logic in a CGA device, ASIC and/or microprocessor or other control device. By designing logic 200 to exploit the use of squared values, processing times can be further reduced in comparison to schemes that would otherwise require computation of non-square powers of the multiplier value. Further, the squared (or other exponentiated) values may be supplied from a common computation source to multiple logic blocks having need of the value. The computed value of the square of H ($H^2$), for example, can be readily provided to multiplication blocks in the second stage 208, thereby removing the need for each logic block to independently derive the appropriate value. In some exemplary embodiments where there are multiple multiplication blocks in the second stage 208, the square of H ($H^2$) can be applied to each multiplication block in parallel. A special case for Galois fields of characteristic 2, used in GHASH, is that the squaring complexity is of the order of an "add" operation. For Poly1305 squaring operations are mode efficient with a complexity of approximately half as compared to general multiplications. When a limited number of security associations are required, table lookups for the path 204 allow the H values to be computed once and used over and over instead of calculating these values on the fly. Computing powers of H outside the critical path allows a reduction of critical path multipliers to reduce the computational demands in the critical path. Precomputation of H values, which are used over and over, relieve the critical path from the demands of these computations. Benefits of this precomputation are realized by the scaling on the number of cryptographic digests that a system can process at high-speed with large scale. Precomputation over non-changing fields allow for high efficiency and high-speed in communications at high-speed and is also a good fit for software implementations. In some exemplary embodiments, this precomputation over non-changing fields can be a common framework for Galois field and Poly1305 Prime field cryptographic digests.

In some exemplary embodiments, the hash subkey incrementation block 212 can be substituted with a table of precalculated powers of a hash subkey since the hash subkey (H) value does not change for a given security association. This allows for the values of $H^{4j}$ to be computed once, stored in a memory and/or lookup table or the like, and used repetitively. Thus, instead of performing the hashtag subkey incrementation for incremented powers of 4j, the hash subkey powers of 4j can be precalculated and stored in a memory.

Using logic 200, then, the sets of input values 202 can be effectively processed through three stages 206, 208, 2010 to arrive at a single output term 220. Once again, the general concepts shown in FIG. 2 may be supplemented, abstracted or otherwise modified in any number of equivalent embodiments, including embodiments that process fewer input terms, more input terms, or terms of different formats. Many other equivalent variations may be formulated.

Combining serial and parallel processing can allow for improved flexibility, particularly in embodiments wherein logic is partially or entirely implemented in CGAs or other hardware. If processing resources support only a limited number of parallel channels, for example, the additional data may nevertheless be combined into the output tag 426 using serial processing techniques that share the parallel channels between multiple sets of input values. Again, serial and parallel processing may be combined and/or used separately in any manner.

Figure 3:
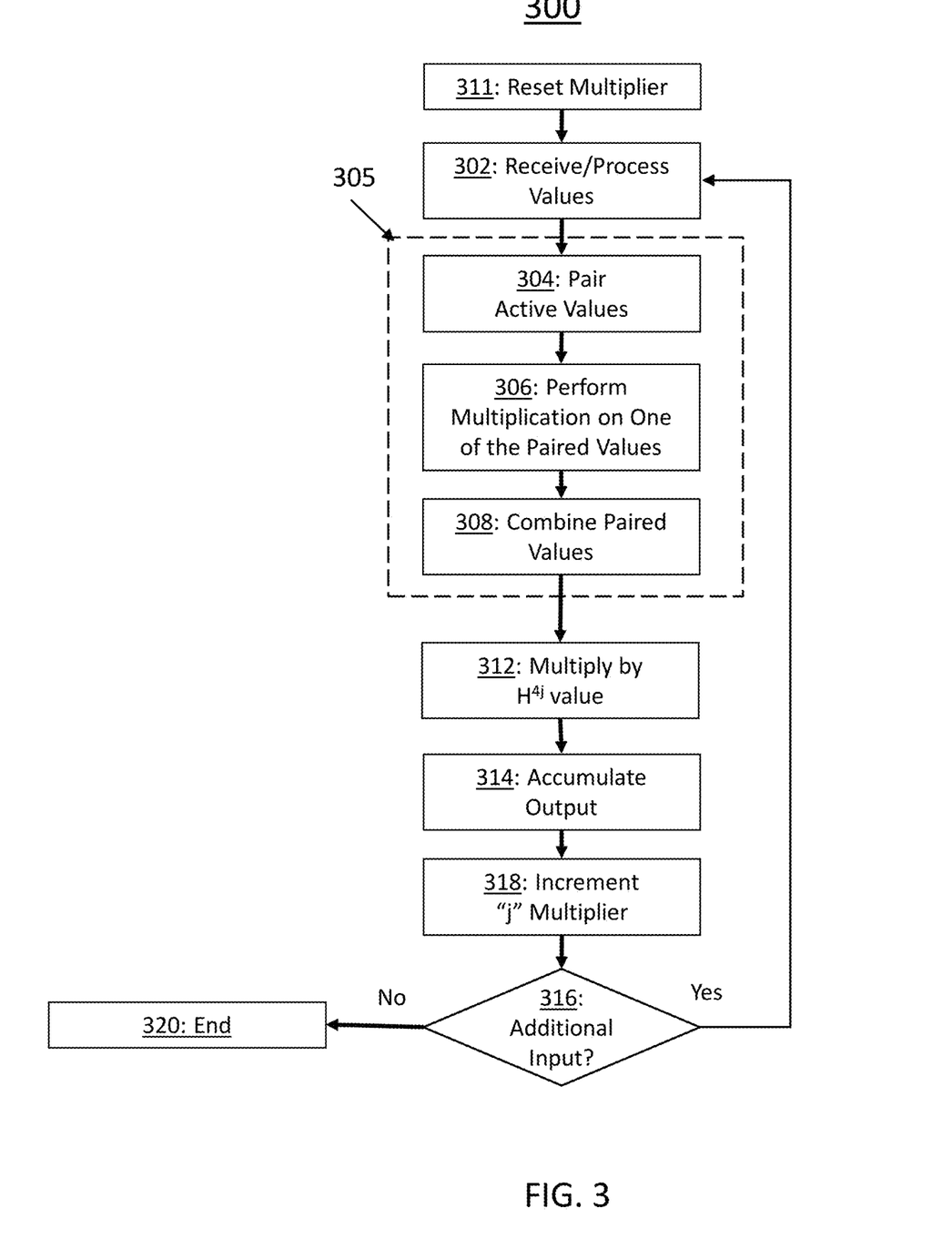
FIG. 3 is flowchart of an exemplary technique for computing digests of a set of input values.

As shown in FIG. 3, an exemplary process 300 suitably includes the broad functions of receiving any number of values to process (function 302) and executing one or more processing stages 305 in which the various values are processed at least partially in parallel. The parallel processing 305 generally includes pairing or otherwise arranging the active values as desired to facilitate combining of multiple terms (function 304), multiplying one of the paired terms by an appropriate multiplier value (function 306), and combining the product of the multiplication with the other paired value (function 308) to reduce the number of active values that will be processed in the next processing stage 305.

In various embodiments, the values received correspond to the $a_0$-$a_n$ values described with respect to FIG. 2 or to the ciphertext 118 as shown in FIG. 1, although other embodiments may receive other values as appropriate. Some implementations may further scale, filter, combine and/or otherwise pre-process the received values in any manner to place the received data into an appropriate format for processing within process 300.

Any number of processing stages 305 may be provided. Generally speaking, the number of processing stages 305 may depend upon the number of input terms and the format of the desired output. In embodiments that seek to pair values of the active data as described below, the output of each processing stage 305 will produce an output with half as many terms as the input. A two stage implementation may therefore reduce four terms to a single term (e.g., 4:2 in the first stage, 2:1 in the second stage). An exemplary four-stage implementation could similarly reduce 16 terms to 8 in a first stage, 8 terms to 4 in a second stage, 4 terms to 2 in a third stage, and 2 terms to 1 term in a fourth stage. Sixteen terms could also be reduced to a single term by serially processing two different sets of eight terms in a three-stage embodiment, as described more fully below. Any number of stages could be provided in other embodiments to support reductions of any number of terms to any other number of terms.

Each stage 305 may involve forming pairs (or other groupings) of active terms (function 304), multiplying one of the paired values by an appropriate multiplier (function 306), and then combining the product of the multiplicative function with the other paired value. Grouping values in this manner allows for parallel processing of the multiplicative function 306 so that the overall time needed to execute process 300 is less than the time that would be needed to execute the multiplications in series. A stage 305 that processes eight terms, for example, could form four pairs of values and could process multiplicative functions of four terms in parallel, as described more fully below.

The multiplicative function 306 suitably includes multiplying one of the paired terms by an appropriate multiplier value or performing other multiplicative functions as desired. In various embodiments, the multiplier value corresponds to a power of the hash subkey (H) used in a GHASH algorithm; other embodiments may use other multipliers as appropriate. Generally speaking, the multipliers applied in the various stages 305 may be related to each other; in the GHASH algorithm, for example, successive stages may apply squared values of the prior stage, as described more fully below. As noted above, the multiplicative function may not be limited to the classical multiplication function, but may include alternate or additional features as well, including any multiplication-type features used in GCM or other algorithms.

After multiplying one of the values in each pair by the appropriate multiplier, the resulting product is combined with the other value in the pair as desired. In various embodiments, this combination is the result of a bitwise XOR or other binary function. Each processed pair, then, results in a single term ("A") that represents two input terms ("$a_n$" and "$a_{n-1}$") according to the relationship:

$$A = a_n X + a_{n-1}$$

wherein "X" represents the multiplier value for that stage. In a GHASH implementation, "X" in the equation above may be simply the GCM hash subkey (H) in a first stage 305, with subsequent stages using appropriate powers of H as the multiplier value X, as described more fully below. Other embodiments could use other operands or multiplier values as desired.

At the end of each processing stage (function 305), the combined paired values are multiplied 312 by an $H^{4j}$. The j value can be incremented 318 between states such that each subsequent GHASH processing state 305 is multiplied by an incremented value of $H^{4j}$, such as $H^0$, $H^4$, $H^8$, $H^{12}$, $H^{16}$ . . . . As noted above, various embodiments could have any number of processing stages 305 depending upon the number of terms that are to be processed.

After the processing stages 305 are complete for a set of input values. The multiplier is reset 311 to an initial value before the processing stages 305, such as $H^1$ and the resulting output from the processing stages 305 is multiplied 312 by an $H^4$ corresponding to the set of the input stage (j). In some exemplary embodiments, the logic that combines $H^{4j}$ powers is also initialized as the start, so initial value is $H^4*0=1$. For the first set of input values, j=0 and the first output is multiplied by $H^0$ or 1. For the second set of input values, the output is multiplied by $H^4$. In some exemplary embodiments, the hash subkey $H^{4j}$ is calculated by the method for each incremented value of j. Alternatively, a table of precalculated powers of the hash subkey since the hash subkey (H) value does not change for a given security association.

After the output is multiplied by the appropriate order of hash subkey, the output is accumulated 314 with prior outputs. The method next increments 318 the "j" value for the hash subkey. If additional inputs remain to be processed 316, the method returns to receive/processor subsequent input values 302. If no additional input values remain to the processed 316, the process is ended 320.

Generally speaking, each of the various steps in process 300 may be performed by any sort of computational hardware, firmware and/or software executing in any environment. In an exemplary embodiment, process 300 is implemented in software instructions that are associated with conventional processing that can be stored in memory or in any other mass storage, and that can be executed on any processor (e.g., any sort of conventional microprocessor, microcontroller, digital signal processor or the like, or any computing system based upon any sort of processor or controller). Other embodiments may be implemented in dedicated processing hardware, firmware and/or other means as desired, including any sort of common gate array, ASIC, or other programmed or programmable digital logic as desired. Some embodiments of the techniques and systems described in FIGS. 2-3, for example, may be very efficiently implemented using FPGA or other CGA structures, although other embodiments may use other types of hardware, firmware and/or software as desired.

The general concepts set forth herein may be readily applied in any number of equivalent settings beyond GCM and other cryptographic techniques. The parallel processing techniques described above may be readily adapted and used to compute any sort of multiplicative hashes or cyclic redundancy check (CRC) codes, for example, or for any other purpose.

Various systems and techniques for processing data are therefore described. These techniques and systems may be variously applied in any military, commercial, personal or other setting for cryptographic or other purposes. Any number of modifications and enhancements could be formulated from the various examples described herein.

As used herein, the word "exemplary" means "serving as an example, instance, or illustration". "Exemplary" embodiments are not intended as models to be literally duplicated, but rather as examples that provide instances of embodiments that may be modified or altered in any way to create other equivalent embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. A method executable by digital processing logic to compute a digest that represents a set of input values processed with a common value, the method comprising:
   calculating a plurality of powers of the common value;
   processing each of a plurality of pairs of first and second elements of the input values, wherein the processing comprises multiplying the first elements of the input values by the common value and combining the products with second elements of the input values;
   performing additional processing using the plurality of processed pairs as the subsequent set of input values and using a power of the common value;
   multiplying each of the processed pairs with one of the plurality of powers of the common value to generate a set of output values wherein the set of output values includes a prior calculated set of header input values processed with the common value;
   accumulating the set of output values; and
   providing the digest as a function of the set of output values.

2. The method of claim 1 wherein the processing comprises multiplying each of the first elements of the input values by the common value in parallel to multiplying the other first elements of the input values by the common value.

3. The method of claim 1 wherein the plurality of powers of the common value are precomputed and stored in a lookup table.

4. The method of claim 1 wherein the common value is a hash subkey.

5. The method of claim 1 wherein the set of output values includes a prior calculated set of trailer input values processed with the common value.

6. The method of claim 1 wherein the set of input values can include any number of input values and wherein any number of the set of input values are processed in parallel to generate one of the set of output values.

7. The method of claim 1 wherein the plurality of powers are multiples of four.

8. The method of claim 1 further comprising serially applying a first set of input values and a second set of input values to the digital processing logic, wherein the additional processing comprises repeating the processing for the first set of input values until only a first single input value remains and then repeating the processing for the second set of input values until only a second single input value remains, and further comprising computing the digest as a function of the first and the second single input values.

9. The method of claim 8 wherein the computing the digest comprises multiplying one of the first and second single input values by a power of the common value.

10. The method of claim 1 wherein the digest is a cyclic reduction check (CRC) code.

11. The method of claim 1 wherein the digest is a Galois Counter Mode (GCM) GHASH digest.

12. The method of claim 1 wherein the digest is a Poly1305 digest.

13. The method of claim 1 wherein a subset of the set of input values are computed according to a cryptographic function.

14. The method of claim 1 wherein the processing comprises multiplying each of the first elements of the cryptographic values by the hash subkey in parallel to multiplying the other first elements of the cryptographic values by the hash subkey and wherein the plurality of powers of the hash subkey are precomputed and stored in a lookup table.

15. A system to process a digest of a set of input values processed with a common value, the system comprising:

a microprocessor including a computational logic configured for calculating a plurality of powers of the common value;

to receive the set of input values and to create a plurality of first paired values from the set of input values, each of the paired values representing a first one of the set of terms that is multiplied by the common value and combined with a second one of the set of terms;

the microprocessor including the computational logic being further configured to create at least one second paired value from the received paired values, each of the at least one second paired values representing a first one of the first paired values that is multiplied by a square of the common value and that is combined with a second one of the first paired values;

multiplying each of the processed pairs with one of the plurality of powers of the common value to generate a set of output values wherein the set of output values includes a prior calculated set of header input values processed with the common value;

accumulating the set of output values; and providing the digest as a function of the set of output values.

16. The system of claim 15 wherein the common value is a hash subkey.

17. The system of claim 15 wherein the set of output values includes a prior calculated set of trailer input values processed with the common value.

18. A method executable by digital processing logic to compute a GHASH digest of a set of cryptographic values processed with a hash subkey, the method comprising:

calculating a plurality of powers of the hash subkey;

processing each of a plurality of pairs of first and second elements of the cryptographic values, wherein the processing comprises multiplying the first elements of the cryptographic values by the hash subkey and combining the products with second elements of the cryptographic values;

performing additional processing using the plurality of processed pairs as the subsequent set of cryptographic values and using a power of the hash subkey;

multiplying each of the processed pairs with one of the plurality of powers of the hash subkey to generate a set of output values wherein the set of output values includes a prior calculated set of header input values processed with the hash subkey;

accumulating the set of output values; and providing the digest as a function of the set of output values.

* * * * *